United States Patent

Harper et al.

[11] Patent Number: 5,725,160
[45] Date of Patent: Mar. 10, 1998

[54] CHIP BLOWER APPARATUS

[75] Inventors: Derick E. Harper, Wilton; Gordon D. Hammond, Elk Grove, both of Calif.

[73] Assignee: Saf-T-Source, Inc., Elk Grove, Calif.

[21] Appl. No.: 639,693

[22] Filed: Apr. 29, 1996

Related U.S. Application Data

[60] Provisional application No. 60/003,790, Sep. 14, 1995.

[51] Int. Cl.⁶ .................................................. B65G 53/46
[52] U.S. Cl. .......................... 239/654; 239/675; 239/142; 406/39; 406/67
[58] Field of Search ........................... 239/654, 672, 239/675, 142; 406/39, 63, 65, 67, 68

[56] References Cited

U.S. PATENT DOCUMENTS

| | | |
|---|---|---|
| 2,338,096 | 1/1944 | Chater . |
| 2,669,271 | 2/1954 | Treckmann . |
| 2,740,230 | 4/1956 | Clapper . |
| 2,844,914 | 7/1958 | Finn . |
| 2,903,302 | 9/1959 | Ross ........................................... 406/67 |
| 3,015,188 | 1/1962 | Reinecker et al. . |
| 3,542,250 | 11/1970 | McRitchie ............................ 406/39 X |
| 4,475,819 | 10/1984 | Balmer . |
| 4,710,067 | 12/1987 | Salley ................................... 406/67 X |
| 4,852,809 | 8/1989 | Davis et al. . |
| 5,178,333 | 1/1993 | Barber et al. . |
| 5,324,143 | 6/1994 | Sanders ................................... 406/67 |

FOREIGN PATENT DOCUMENTS 636710  12/1958  Canada ................................... 406/67

OTHER PUBLICATIONS

AMZ Magnum Brochure, Zimmerman Equipment Company, Nashville, TN Nov. 1993.

Rexius Express Blower Brochure, Rexius Fores By-Products, Inc. Eugene, OR -Oct. 1993.

*Primary Examiner*—Kevin Weldon
*Attorney, Agent, or Firm*—John P. O'Banion

[57] ABSTRACT

A chip blowing apparatus for application or dispersion of wood chips or like aggregate material. The invention includes a hopper with an auger for directing materials to the bottom of the hopper. An air lock feeder adjacent to the bottom of the hopper receives material therefrom. A rotating shaft with a plurality of vanes is included in the air lock feeder. Pressurized air is directed into the air lock feeder to fluidize materials and impart momentum thereto, thereby entraining the solid material in an air stream. The entrained material then exits and outlet port and is directed by hose to a nozzle for application of material to surfaces.

19 Claims, 5 Drawing Sheets

CHIP BLOWER APPARATUS

CROSS-REFERENCE TO RELATED APPLICATIONS

This application claims the benefit of U.S. Provisional application Ser. No. 60/003,790 filed on Sep. 14, 1995.

BACKGROUND OF THE INVENTION

1. Field of the Invention

This invention pertains generally to devices and methods for dispersing chipped and fibrous materials, and more particularly to a chip blowing apparatus for use in applying wood chips and engineered wood fiber material onto playgrounds and other landscaped surfaces.

2. Description of the Related Art

In the past, the devices and methods used to install aggregate materials for playgrounds and landscaping have ranged from using manual labor and hand operated conveying devices (wheel barrows), to the use of construction equipment such as tractors, front end loaders, or a combination of both. Various apparatus and systems, including blower devices, are known for blowing, dispersing or applying materials to land, building, and other surfaces. These devices and systems, however, have generally been developed for agricultural use with seeds and fertilizers, for applying surfacing materials to roads, or for dispensing blown insulation material during building construction, and are not suitable for application of aggregate materials for landscaping, playgrounds, and other surfaces.

Pneumatically conveyed materials are generally applied in one of three ways: light phase, using a high volume/low pressure suction fan at operating pressures of 1 to 3 PSI; medium phase, wherein a medium volume/medium pressure blower or fan is used at operating pressures of 2 to 30 PSI; and dense phase, which uses a low volume/high pressure air compressor at operating pressures of 80 to 120 PSI. The terms light, medium and dense phase are used in the art to generally describe the ratio of solid material to air within an applicator hose conveying the material.

Generally, for aggregate materials it is desirable to move as much material as fast as possible, and a dense phase material application system would appear to be the obvious choice. However, dense phase systems require at least two pressure silos which cannot readily be loaded or transported by a materials carrier. Additionally, a dense phase system for application of aggregate materials would require a power plant so large to produce the necessary high air pressure that it would not be cost effective or practical.

Currently existing light phase blowing equipment such as insulation blowers typically utilize a low air pressure/high air volume fan to vacuum up and pneumatically convey insulation product or material. However, the open chamber vacuum design used by insulation blowers to draw product into the airstream of an applicator hose severely limits the cubic yardage output of such blowers, with a maximum output of approximately 5 cubic yards per hour. This output rate falls considerably short of the 30 cubic yards per hour necessary to make such blowers commercially viable for use with aggregate materials.

Thus, a medium phase system as described above would be best suited for use in pneumatic conveyance of aggregate materials. Medium phase systems generally utilize an airlock feeder to meter product into the airstream and a positive displacement medium air pressure, medium air volume blower to convey the product through an applicator hose. Such a system has the capability to use a smaller volume of air to move a larger volume of product. However, a medium phase rate for pneumatic conveyance and application of aggregate materials such as engineered wood fiber has not heretofore been achieved.

Accordingly, there is a need for a chip blower apparatus which pneumatically conveys and applies aggregate materials, which conveys such materials at medium phase rates, and which may be used in landscaping, playground, and other ground covering applications.

SUMMARY OF THE INVENTION

The primary object of the invention is to provide a blower system to transfer "Engineered Wood Fibre", wood chips, or other aggregate landscaping material from a "live floor" truck directly to a playground or other landscaped area. The use of a blower and hoses or pipes to transfer material, as provided by the invention, eliminates the need for a tractor or front loader, and provides a clean and efficient manner of applying material to ground surfaces. The present invention eliminates the damage to landscaping done by traversing to and from the area with wheeled equipment. Material can be installed in a shorter amount of time with less manpower. The invention enables surfacing to be added or topped off to existing playgrounds and other areas without disturbing surrounding landscaping. The invention allows materials to be installed to depths of as little as ½" without leaving bare spots or areas that have excessive material. Top-offs to playgrounds and other areas may be done quickly and economically by utilizing the present invention, and the requirement of stockpiling aggregate material at the application site is eliminated.

The present invention utilizes an airlock feeder to meter or entrain aggregate material into an airstream and a positive displacement medium air pressure, medium air volume blower to convey the product through a hose to the site of material application. The invention uses a smaller volume of air to move a larger volume of material than has been achieved in prior art pneumatic material conveying devices and systems. In general terms, the present invention comprises a hopper or other container for holding wood chips or the like, an air lock feeder, coupled to the hopper adjacent a bottom opening, agitating means included in the hopper for directing material downward in the hopper, chamber conditioning means for increasing pressurized air density and for reducing dust, and blower means, interfaced with the air lock feeder, for providing pressurized air to the air lock feeder and fluidizing and imparting momentum to materials contained therein.

By way of example and not of limitation, the hopper is of a generally conical configuration with an opening adjacent a lower apex. The agitating means included in the hopper preferably comprises an opposing flute-type auger which is positioned to transport wood chips or like material to the bottom of the hopper for transfer to the air lock feeder. The air lock feeder preferably comprises a generally cylindrical steel housing with a rotating shaft longitudinally mounted therein. A plurality of vanes or blades are included along the shaft which define a plurality of longitudinal chambers within the housing which move with the rotation of the shaft. An air inlet port and air outlet port are included at opposite ends of the cylindrical housing, and which are in flow communication with the moving chambers. Preferably, air supercharging means are included with the air lock feeder in association with the chambers for increasing the output of the air lock feeder. The blower means preferably comprises a pneumatic blower or positive displacement (spiral or gear) blower, and is interfaced with the air lock feeder through an inlet port. A hose or tube is used in association with the chip blower apparatus, and is coupled to the outlet port on the air lock feeder. A power source is preferably included with the invention, and is interfaced with the blower, auger, and rotational shaft of the air lock feeder for providing power thereto.

The apparatus comprising the invention is preferably mounted on a trailer that can be positioned at the back of a "live floor" truck or other vehicle. The wood chip or other aggregate material from the truck is emptied directly into the hopper of the chip blower apparatus, preferably by an air belt or other conveyor means. The auger or other agitator within the hopper directs material downward in the hopper and generally prevents sticking or collection of materials along the hopper walls. Material exits the bottom apex of the hopper and enters the air lock feeder wherein the vanes on the rotating shaft disperse the material within moving chambers in the air lock feeder. Pressurized air from the blower means enters the air lock through the inlet port, and generally fluidizes and imparts momentum to the materials therein. The fluidized wood chip material exits the air lock feeder through an outlet port and is directed into pipes and/or hoses to the application site. An operator then directs the material onto the areas of need.

The chip blower apparatus comprising the invention provides a clean and efficient means of conveying aggregate materials. The need for heavy construction equipment to convey and place materials is eliminated. The invention greatly reduces the need for labor due to the fact that air conveys and places the aggregate material, requiring only a minimal amount of labor to finish grade the covered areas. The invention also provides an efficient method for the installation of organic materials on the top of retaining walls and steep slopes that are unaccessible by conventional means. Application of aggregate insulation materials for building construction may also be carried out with the invention. When installing "Engineered Wood Fibre" in playgrounds with the invention, the material is compacted as it is installed, thereby allowing immediate wheel chair access to the playground for "ADA" purposes.

An object of the invention is to provide a chip blower apparatus for application of wood chips or other aggregate materials to land surfaces without the use of heavy equipment.

Another object of the invention is to provide a chip blower apparatus which is time and labor efficient.

Another object of the invention is to provide a chip blower apparatus which allows application of aggregate materials without damage to surrounding landscaped areas.

Another object of the invention is to provide a chip blower apparatus which allows even application of aggregate materials to shallow depths without creating bare spots or spots with excessive material.

Another object of the invention is to provide a chip blower apparatus which allows medium phase output and pneumatic conveyance of aggregate materials.

Further objects of the invention will be brought out in the following portions of the specification, wherein the detailed description is for the purpose of fully disclosing the invention without placing limits thereon.

BRIEF DESCRIPTION OF THE DRAWINGS

The invention will be more fully understood by reference to the following drawings which are for illustrative purposes only.

DETAILED DESCRIPTION OF THE PREFERRED EMBODIMENT

Referring more specifically to the drawings, for illustrative purposes the present invention is embodied in the apparatus which is generally shown in FIG. 1 through FIG. 5. It will be appreciated by persons of ordinary skill in the art that the apparatus may vary as to configuration and as to details without departing from the basic concepts as disclosed herein. While the invention is described in terms of applying aggregate materials, it should be readily apparent that the invention may be utilized for entraining a variety of solid materials into air or other gas, with the solid materials comprising aggregate, fibrous, and particulate materials of various densities and porosities.

Figure 1:
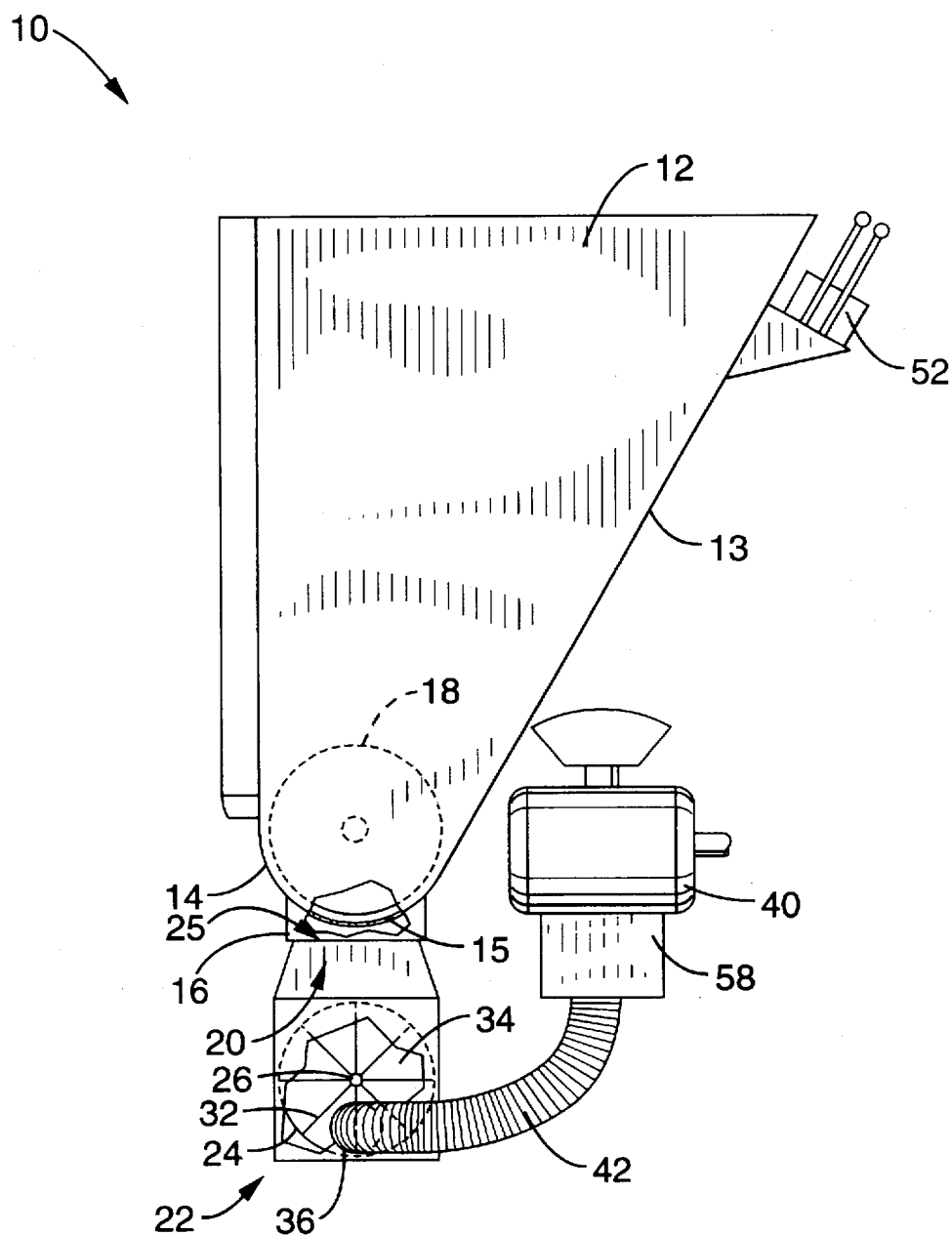
FIG. 1 shows a hopper, air lock feeder, blower, and chamber conditioning system of a chip blower apparatus in accordance with the present invention, with the air lock feeder and hopper shown in partial cross-section.
Figure 2:
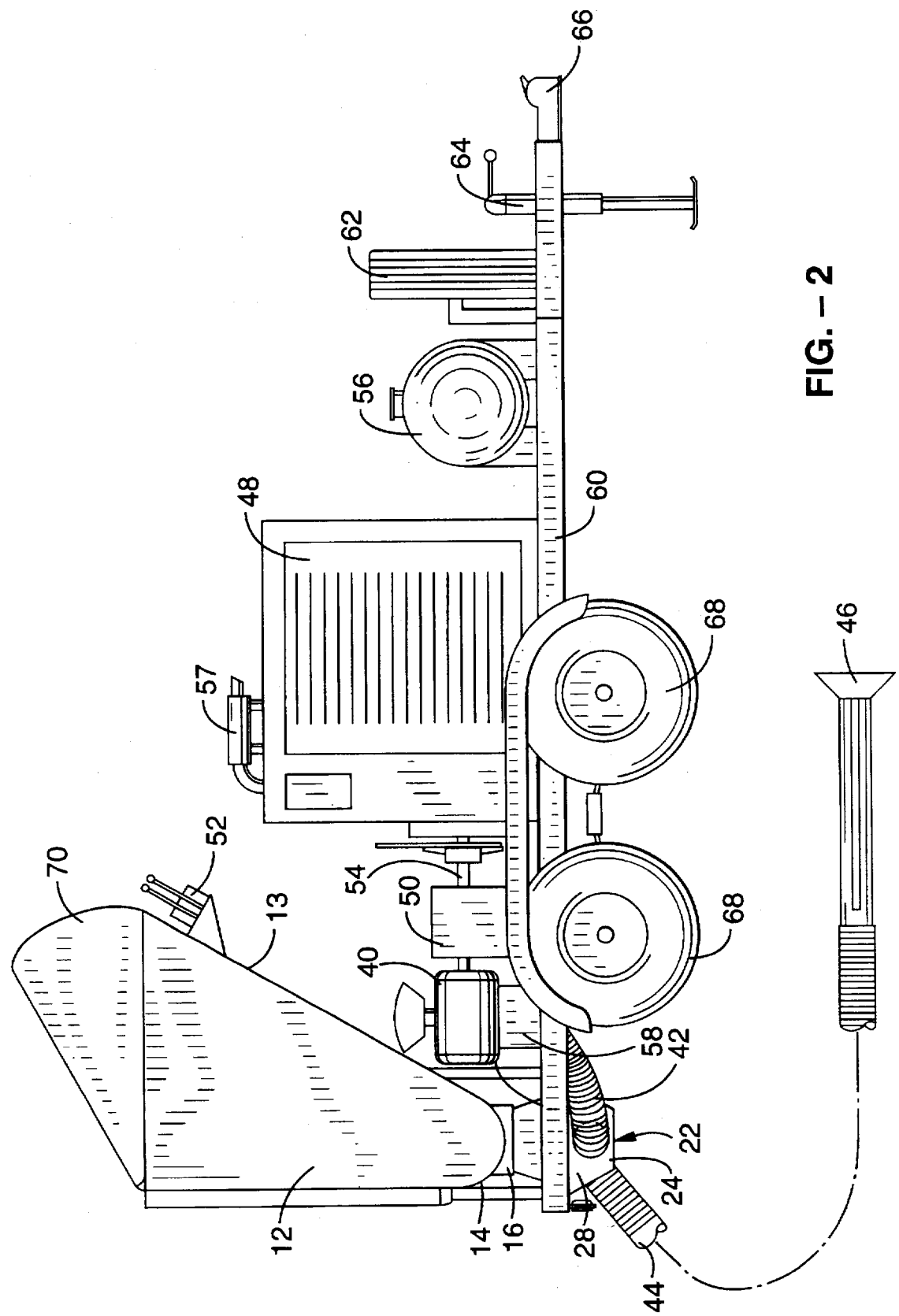
FIG. 2 is a side view of the chip blower apparatus of the invention shown mounted on a vehicle trailer.
Figure 3:
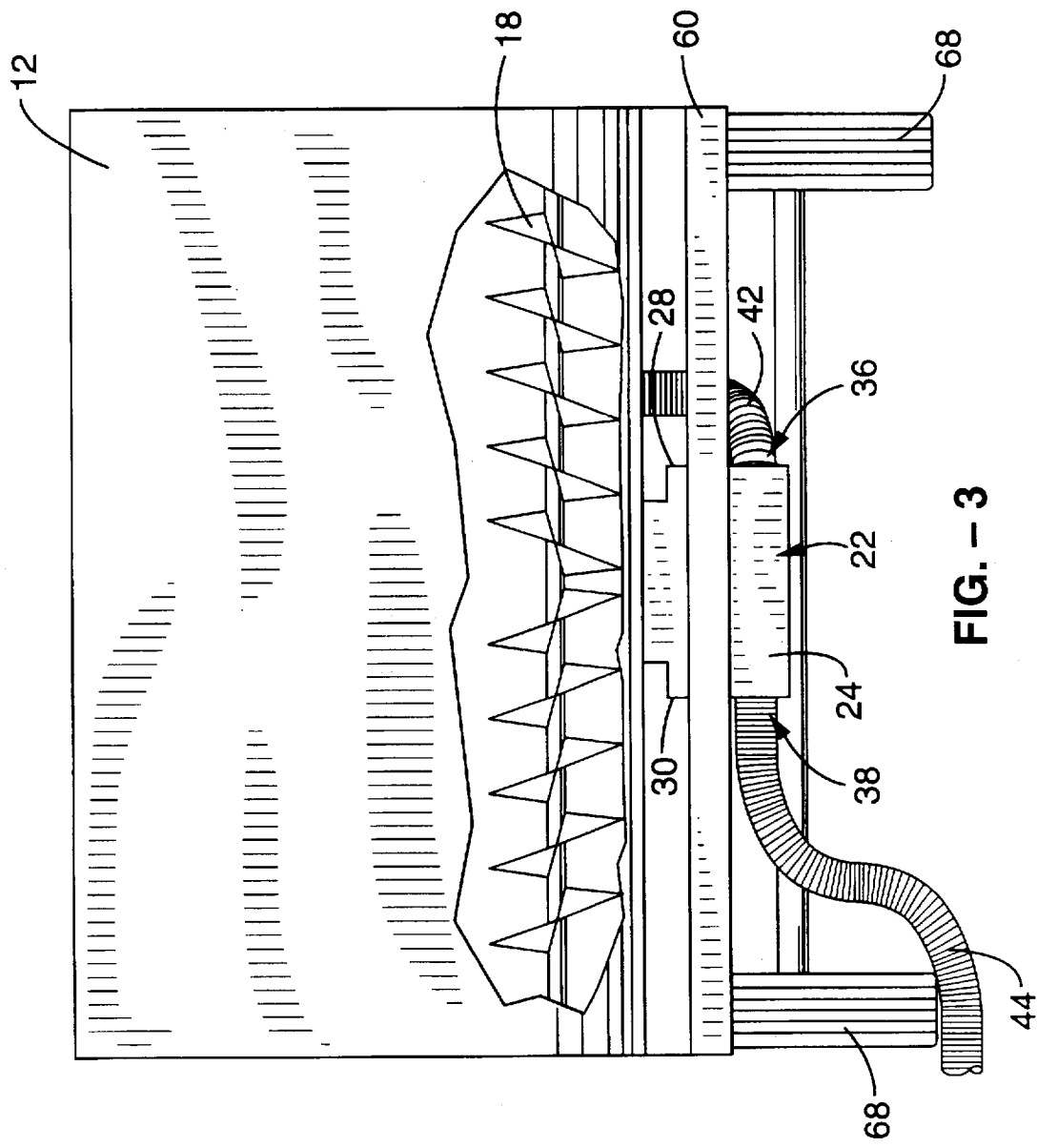
FIG. 3 is a back end view of the chip blower apparatus and trailer of FIG. 2, showing the hopper in partial cross-section.

Referring now to FIG. 1 through FIG. 3, there is shown generally a chip blower apparatus 10 in accordance with the present invention. The apparatus 10 comprises a hopper 12 or other like container for gravity, gravity assisted, or mechanical delivery of materials. Hopper 12 is preferably structured and configured to fit adjacent the back of a semi truck or other vehicle which carries wood chips or other material to be dispersed. The interior (not shown) of the hopper 12 is preferably structured and configured in such a manner as to prevent the material from bridging, castle-forming, or otherwise sticking thereto. Preferably, hopper 12 includes a tapered back 13 with a slope of about sixty degrees, to prevent such sticking of materials to the back 13 of hopper 12. Hopper 12 has a radius break 14 and a saddle-shaped bottom 15 adjacent a lower apex 16 of hopper 12. An auger 18 or other agitating means, discussed further below, generally fits within hopper 12 adjacent radius break 14 and lower apex 16. The bottom 15 of the hopper includes an opening 20 (FIG. 1) with a conventional flange fitting (not shown) that mates up to an air lock feeder 22, discussed further below.

The invention includes agitating means, associated with hopper 12, for directing materials downward within hopper 12 towards opening 20 and for preventing material from sticking to the sides of hopper 12. As related above, the agitating means preferably comprises a reversible, center feed auger 18 as shown in FIG. 3. Auger 18 is preferably of an opposing flute design that transports material to the opening 20 in the bottom apex 16 of hopper 12; however, other auger configurations may also be used with the invention. Auger 18 is powered by a conventional hydraulic motor (not shown) through a standard chain and sprocket reduction drive (also not shown). Auger 18 transports material to the center of hopper 12, maintains material density prior to entry of material into air lock feeder 22, and can be used to regulate the rate of delivery of material to air lock feeder 22.

As can be seen, therefore, since auger 18 transports material to the center of hopper 12, bridging of materials in the hopper above auger 18 will be prevented. Auger 18 will overfeed the material and cause it to boil up, thereby breaking up any bridging in the hopper above the auger. In addition, this configuration will reduce the material pressure at the outlet of hopper 12 and keep the material loose as it enters air lock feeder 22. Other agitating means, such as vibrating devices, chain and belt conveyor systems, and fan-type agitators are also contemplated for use with the invention as alternatives to auger 18.

An air lock feeder or pneumatic feeder 22 is provided with the invention for metering and entraining material to be dispersed with pressurized air or gas. The air lock feeder 22 is positioned adjacent the bottom apex 16 of hopper 12 in material-receiving communication with opening 20 by means of a matching opening and mating flange (not shown). Air lock feeder 22 is preferably of a "blow-through" type design, and generally includes a round or cylindrical housing 24, with a lateral or top opening 25 adjacent opening 20 in hopper. A rotating shaft 26 (FIG. 1) is longitudinally mounted therein between housing ends 28, 30 (FIG. 3) of housing 24. Suitable bearing supports or arrangements (not shown) or other friction reducing means are used in association with shaft 26 and housing 24. A plurality of vanes or blades 32 are coupled to shaft 26 and extend axially outward from shaft 26. The plurality of vanes 32, together with the housing 24, generally define a plurality of longitudinal chambers or locks 34 (FIG. 1) within air lock feeder 22, with chambers 34 interposed between adjacent vanes 32 and generally moving within air lock feeder housing 24 as shaft 26 rotates therein. Chambers 34 generally have a wedge or "pie slice" cross-sectional shape, as shown in FIG. 1. An inlet port 36 for pressurized air is included on end 28 of housing 24, and an outlet port 38 for fluidized material is included on end 30 of housing 24. Preferably, inlet port 36 and outlet port 38 are longitudinally aligned with each other on the opposite ends 28, 30 of housing 24, so that air flow between inlet and outlet ports 36, 38 is generally parallel to shaft 26. Inlet port 36 and outlet port 38 are positioned on air lock feeder 22 so that, as shaft 26 rotates, chambers 34 are simultaneously co-linear or aligned with both inlet port 36 and outlet port 38 once during each rotational period so that material within chambers 34 can be fluidized and momentum imparted to material within the chambers 34 by pressurized air entering the chambers 34 from inlet port 36, with the thusly fluidized or air-entrained material in chambers 34 exiting air lock feeder 22 via outlet port 38. Preferably, inlet port 36 and outlet port 38 are wedge- or trapezoidal shaped in cross-section adjacent the ends of chambers 34 in housing 22, and transition to a round shape as shown in FIG. 1 to accept flexible hoses, as discussed below. Vanes 32 preferably made of steel and are precision-machined to provide tight clearances between the ends of vanes 32 and housing 24 to minimize loss of air pressure. Shaft 26 is likewise precision mounted within housing 24 to minimize air pressure loss.

Blower means, for providing pressurized air to the air lock feeder 22 and for fluidizing and imparting momentum to materials contained therein, are also included with the present invention. The blower means may be a conventional positive displacement (spiral, rotary or gear) or pneumatic blower 40, for providing high volumes at low pressure. A preferred blower device 40, for example, is a rotary-type positive displacement blower which can produce 1000 CFM at 15 PSI at 2400 RPM, for use with an air lock feeder 22 having a capacity of from approximately 1.5 to approximately 2.5 cubic feet and with the capacity of each chamber 34 being 545.2 cubic inches. These feeder and chamber dimensions and blower output are provided for exemplary purposes, and the requirements of blower 40 will of course vary with the structure and configuration of air lock feeder 22, which in turn can vary for different applications of the invention. Blower 40 is interfaced with air lock feeder 22 by hose 42 which couples to inlet port 36 via conventional fittings. A check valve (not shown) is located between air lock feeder 22 and blower 40 to prevent any back feeding of aggregate material from feeder 22 into blower 40. Other blower means, including stored compressed air, as well as other gases such as nitrogen, may be employed with the invention.

The invention is utilized with a hose 44 for transporting material to the site of application whereupon material is dispersed or applied through nozzle 46. Hose 44 is coupled to outlet port 38 on air lock feeder 22. Quick coupler fittings and a tapered tube (not shown) can be used in association with the connection of hose 44 and outlet port 38 to facilitate attachment and removal of hose 44. Hose 44 is preferably of standard flexible construction, and may vary in length as required to reach material application sites which will vary in distance from the apparatus 10.

A power source or power plant is included with the invention for powering or driving the various pans of the apparatus 10. Referring more particularly to FIG. 2, the power plant preferably comprises a standard gas or diesel motor or engine 48 having an eighty to one hundred and twenty horsepower rating. Diesel plant 48 powers a hydraulic pump 50 that in turn drives the air lock feeder 22 and auger 18 by hydraulic motors (not shown). Hydraulic pump 50 is preferably a twenty to thirty GPM variable output pump. A control panel 52 allows control of the hydraulic motors for auger 18 and air lock feeder 22. Control panel 52 includes flow control valves (not shown) for controlling the rotational rate of auger 18 and feeder 22. Directional control of auger 18 and feeder 22 are provided by toggle switches (not shown) which connect to electric over hydraulic solenoids (not shown). A throttle (not shown) may be included for diesel engine 48. Display means (not shown) which include LCD revolution counters for auger 18 and feeder 22, a hydraulic pressure gauge, air pressure gauge, tachometer and other readout or feedback for an operator from the various parts of chip blower apparatus 10. An output shaft 54 of the engine 48 couples directly to the blower 40, which is powered directly from engine 48. Engine 48 receives fuel from tank 56, and exhausts through pipe 57. A drive shaft (not shown) is mechanically interfaced with shaft 26 of air lock feeder 22 to impart rotational power thereto.

A chamber conditioning system 58 is preferably included with the invention for increasing density of the air from blower 40 to allow entrainment of greater quantities of material and to reduce or control dust associated with use of the chip blower apparatus 10. The chamber conditioning system 58 includes an atomizing nozzle (not shown) located in the air supply system between blower 40 and the check valve, which injects aerosolized water directly into the transport air stream prior to entry of the air stream into inlet port 36 and chambers 34. Chamber conditioning system 58 includes an air compressor (not shown) powered by diesel station 48. A water tank or reservoir (not shown) provides water to the atomizer nozzle via water lines (not shown). Preferably, the atomizer nozzle of chamber conditioning system 58 operates at thirty to fifty PSI of air from the compressor, with three to thirty-five gallons per hour of water at thirty to sixty PSI of water. The water pressure is supplied from tank or reservoir (not shown) by a twelve-volt water pump, powered by diesel engine 48 and plumbed to a pressure regulator (not shown) opposite the atomizer nozzle. A conventional garden hose may be hooked up to the water pump to provide a water supply to chamber conditioning system 58 as an alternative to supplying water from a water tank.

The chip blowing apparatus 10 is preferably mounted on a trailer 60 for towing behind a vehicle. As shown in FIG. 2, trailer 60 includes a spare tire 62, a leveling jack 64, and a tow hitch 66, and is mounted on wheels 68. A dust cover 70 is shown on hopper 12.

The chip blowing apparatus 10 comprising the invention is utilized generally by positioning trailer 60 so that hopper 12 is adjacent to the back end of a truck or other vehicle (not shown) which carries a supply of wood chips or other material to be blown or dispersed. Wood chips or other material to be applied are loaded into hopper 12 from the truck, preferably by an air belt or other conveyor system (not shown), although hopper 12 may be hand loaded by an operator. Auger 18 directs material downward in hopper 12, through opening 20 in bottom 15 of hopper 12, and into air lock feeder 22 via opening 25 in housing 24. Auger 18 also compresses or controls the density of material in the bottom 15 of hopper 12 prior to transfer to feeder 22.

Aggregate material enters air lock feeder 22 from hopper 12 through opening 20 adjacent the top of housing 24, and each chamber 34 passes by opening 20 and receives material from hopper 12 at each rotation of shaft 26. Thus, as shaft 26 rotates, the chambers 34 between vanes 32 fill with material entering air lock feeder 22 from hopper 12 while the chambers 34 are adjacent opening 20 in hopper 12. Chambers 34 thus filled with material rotatably move under the action of shaft 26 until the chambers 34 are aligned with inlet port 36 and exit port 38, which occurs once during each rotation period of shaft 26 for a duration which varies with the rotational speed of shaft 26. As material-containing chambers 34 move past inlet port 36, pressurized air from blower 40 applied through hose 42 enters the chambers 34 to fluidize the material and impart momentum to the material, so that material is generally entrained in the air stream and propelled out of the chamber 34 and air lock feeder 22 through outlet or exit port 38, and hence through hose 44 to nozzle 46. The fluidized material within chambers 34 is thus evacuated from the chambers 34 as the chambers move past inlet port 36 and exit port 38 under the action of pressurized air. The cleared or emptied chambers 34 then rotatably move under the action of shaft 26 back towards opening 20 in hopper 12, at which point the chambers are again filled with material and the process repeated. Thus, chambers 34 rotate within housing 24 of feeder 22 and line up with the inlet and outlet ports 36, 38 in much the same way as the revolving cylinder in a pistol lines up with the barrel.

An operator manually controls nozzle 46 for accurate application of materials to surfaces for landscaping, erosion protection, playground surfacing, or other purposes. The length of hose 44 may be varied as required depending upon the particular application of the invention, and to allow access to areas remote from trailer 60.

Under certain conditions, such as high air pressures from blower 40, high feed rates from hopper 12, high shaft 26 rotational rates, and/or high material densities or other particular material properties, the air lock feeder 22 described above may not provide effective air entrainment of materials and thus can result in material being expelled from chambers 34 and into exit port 38 in the form of solid slugs of material rather than a fluidized air/material mix suitable for conveying material via transport hose 44. Under such conditions, the solid slugs of material quickly plug hose 44. This problem can be avoided by rotating the feeder 22 at lower RPM and reducing the rotational rate of auger 18 to reduce delivery rate of material from hopper 12. However, these approaches, while avoiding hose clogging and improving air entrainment, also reduce the cubic yardage output of the apparatus 10. In order to provide increased product output and avoid slug formation, air supercharging means for increased output of air-entrained solid materials are preferably included with the invention.

Figure 4:
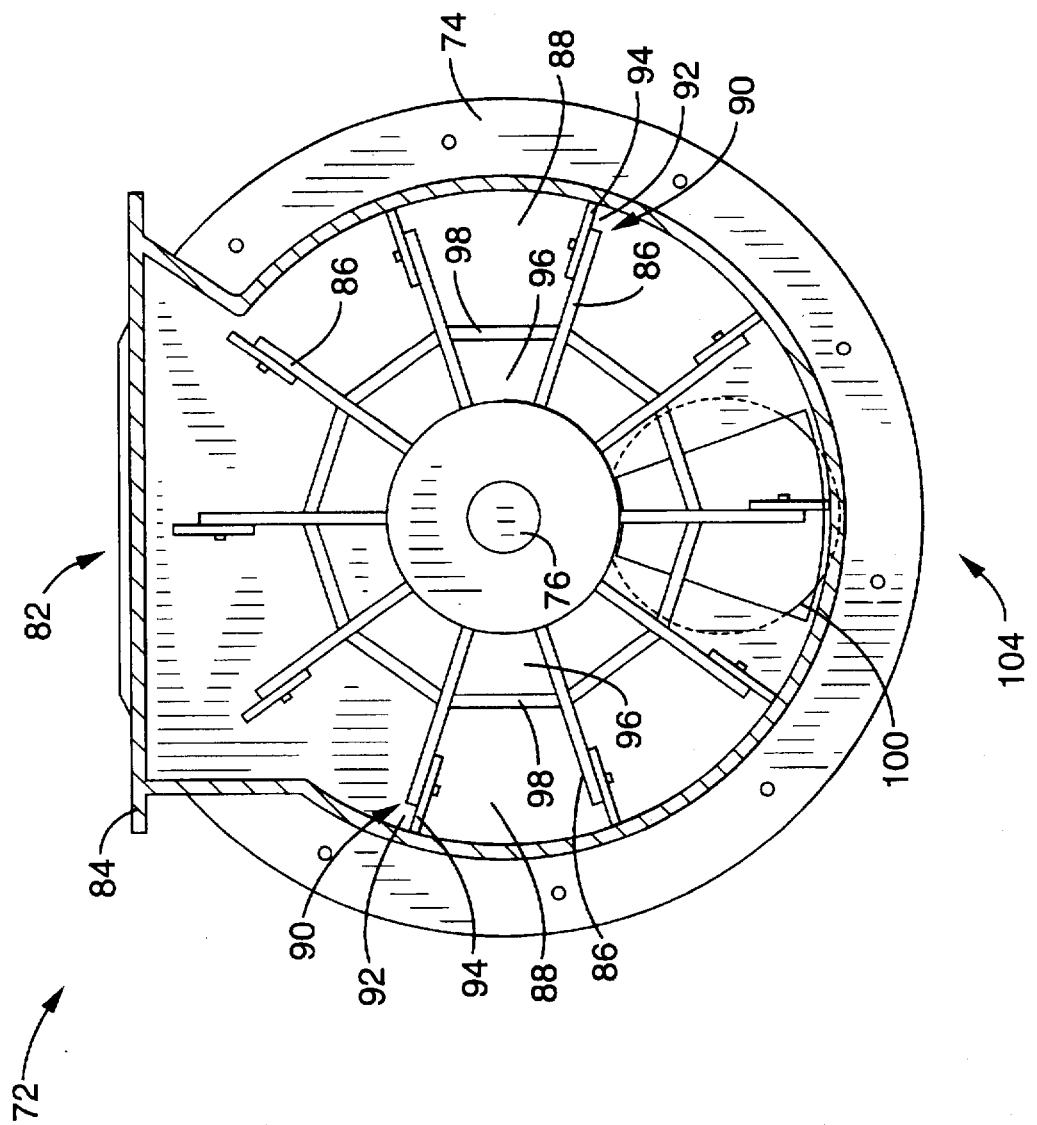
FIG. 4 is an end view in cross-section of an alternative embodiment air lock feeder for use with the present invention.
Figure 5:
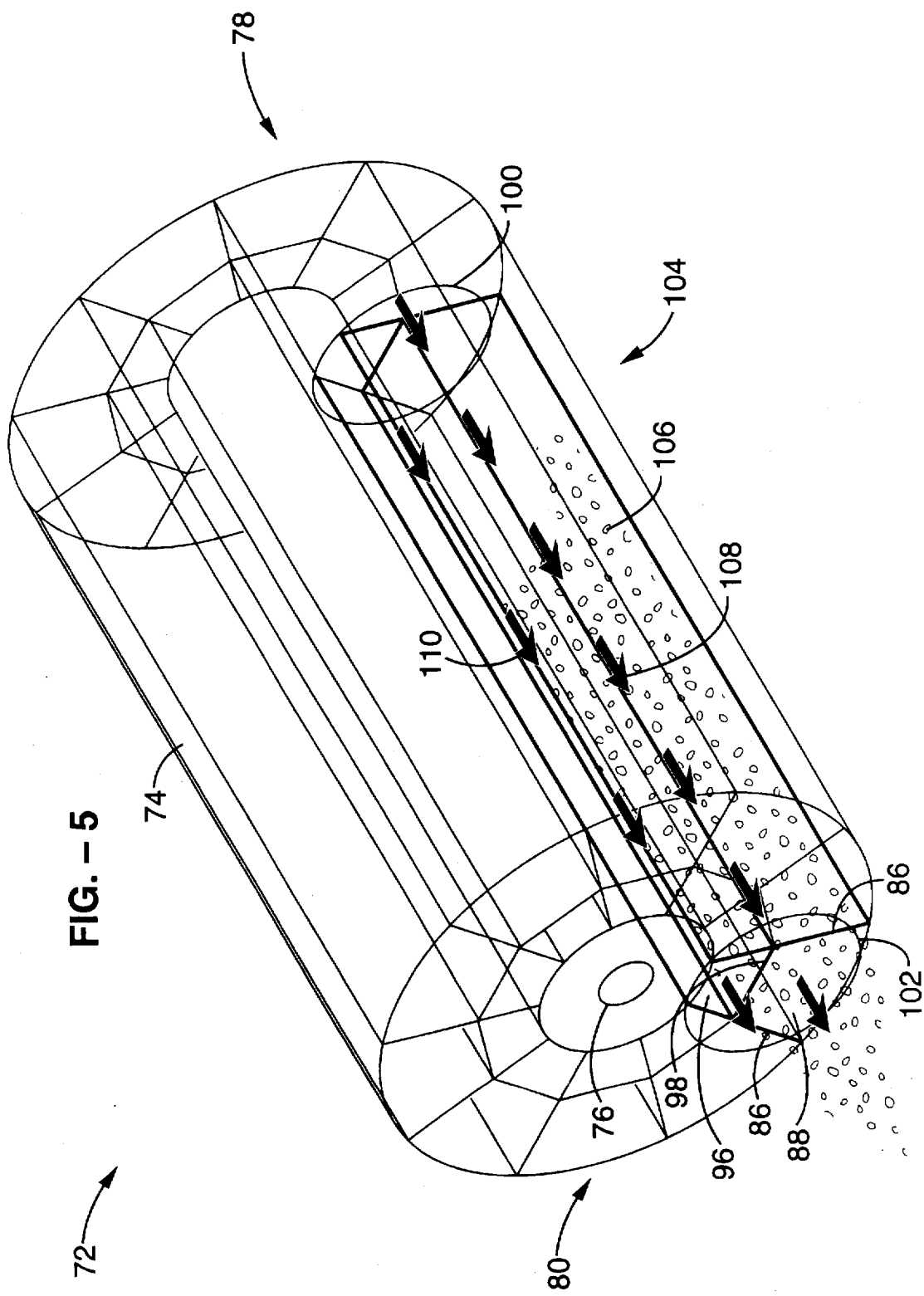
FIG. 5 is a perspective view showing diagrammatically the motion of aggregate material and air through a material fluidization chamber and supercharger chamber of the air lock feeder of FIG. 4.

Referring now to FIG. 4 and FIG. 5, an alternative embodiment air lock feeder 72 in accordance with the present invention is generally shown which utilizes air supercharging means for higher volume output of pneumatically conveyed materials. Air lock feeder 72 includes a generally cylindrical housing 74 with a rotatable shaft 76 longitudinally mounted in housing 74 between first and second ends 78, 80 (FIG. 5) of cylindrical housing 74. Suitable bearing supports (not shown) are included in association with shaft 76 adjacent ends 78, 80 of housing, and shaft 76 is mechanically interfaced with a rotational power source such as a hydraulic motor (not shown) by standard means. A top facing opening 82 communicates with the bottom of a hopper such as hopper 12 shown in FIG. 1 through FIG. 3. A flange adapter 84 is provided about opening 82 to facilitate coupling to a hopper. A plurality of vanes 86 are laterally disposed about shaft 76 and define a plurality of material entrainment or fluidization chambers 88 within housing 74 in a paddle wheel-like arrangement, with chambers 88 generally elongated in shape, parallel to shaft 76, and having generally a wedge or trapezoidal shaped cross section. To reduce the hydraulic torque required to rotate shaft 76 and vanes 86, the ends 90 of vanes 86 are machined to provide gaps 92 between the ends 90 of vanes 86 and feeder housing 74. A resilient strip or seal 94 of polymeric material such as polyurethane is coupled to the end 90 of each vane 86. Resilient strips 94 reduce the amount of shearing of material during rotation of shaft 76 and vanes 86 by flexing as they make contact with housing 74. Resilient strips 94 additionally provide an effective seal to minimize air pressure loss between vanes 86 and housing 74.

The air lock feeder 72 includes supercharging means for entraining materials within an air stream at high output rates. The supercharging means preferably comprises a plurality of auxiliary or supercharger air channels 96 which are laterally disposed about shaft 76. Air channels 96 are formed by a plurality of dividers or barriers 98 which separate the regions between adjacent vanes 86 to separate and define a dual chamber arrangement of material entrainment chambers 88 and adjacent air channels 96. The elongated region between each pair of adjacent vanes 86 thus includes an elongated air channel 96 of generally triangular or trapezoidal cross-section, and an elongated material entrainment chamber 88 of generally trapezoidal cross-section, which are parallel to each other and which are separated from each other by divider 98, with air channel 96 adjacent shaft 76 and material entrainment chamber 88 adjacent housing 74. A pressurized air inlet 100 and pressurized air outlet 102 are included at opposite housing ends 78, 80 of housing 74 and generally adjacent to the bottom 104 of housing 74. Air inlet 100 and outlet 102 are generally trapezoidal in cross-sectional shape adjacent chambers 88, 96, and transition to a round cross section to allow attachment of flexible hoses as described above.

Referring again to FIG. 1 through FIG. 3 as well as FIG. 4 and FIG. 5, the air lock feeder 72, in operation, receives aggregate or other solid material to be entrained, conveyed and dispersed from hopper 12 via opening 82 in the top of housing 74 while shaft 76 and vanes 86 are rotating within housing 74. Material entering air lock feeder 72 through opening 82 is received by material entrainment chambers 88 as they move or rotate past opening 82, and the material thus received by chambers 88 is transported downward towards the bottom 104 of housing and towards inlet port 100 and outlet port 102. Air channels 96 are separated from material entrainment chambers 88 by dividers 98, as related above, and dividers 98 prevent air channels 96 from receiving any solid material from opening 82 and hopper 12.

Referring more particularly to FIG. 5 as well as FIG. 4, as each material entrainment chamber 88 and adjacent air channel 96 rotate into alignment inlet and outlet ports 100, 102, pressurized air from a blower or other source enters the material entrainment chamber 88 through inlet port 100 to fluidize and impart momentum to the solid material contained therein, and to move or convey the entrained material towards exit port 102 and subsequently through a hose as described above for applying the material. The air-entrained material in chamber 88 is shown generally as particles 106, which are carried by the air stream, indicated by arrows 108, that passes through chamber 88 between inlet and outlet ports 100, 102. At generally the same time as material particles 106 are being entrained in air stream 108 within material entrainment chamber 88, pressurized air also passes through the adjacent air channel 96, as shown by air stream arrows 110. The air stream 110 passing through air channel 96 joins the air-entrained material 106 and air stream 108 in chamber 88 adjacent outlet port 102. The influx of air stream 110 into the material particles 106 and air stream 108 from chamber 88 adjacent exit port 102 preven entrained material 106 at exit port 102 as described above. Thus, the dual chamber arrangement of the supercharger means of the invention allows air lock feeder 72 to operate at higher air pressures from inlet port 100, to operate at faster rotational rates of shaft 76 and vanes 86, and/or to operate at faster solid loading rate through opening 82, than is possible with other known feeder systems for entrainment of solid materials within air streams.

The material or product chambers 88 of air lock feeder 72 are positioned at the wide end of the pie slice-shaped cross-sectioned region between adjacent vanes 86, to provide a trapezoid shaped air channel 96 positioned directly adjacent the trapezoidal material entrainment chamber 88. This creates a material entrainment chamber 88 having a cross-sectional area that is much closer in size and shape to that of standard transport hoses of circular cross-section which are coupled to exit or outlet port 102, thereby providing a smoother transition at the outlet port 102 of air lock feeder 72. The dual chamber design of air lock feeder 72 virtually eliminates the risk of solid material 106 plugging or jamming within a hose coupled to outlet port 102. The additional air channels 96 provided by the super charging means allows some pressurized air 110 to bypass the material entrainment chambers 88 and then add or force additional air and pressure into the entrained solid material 106 from the material entrainment chambers 88 as the entrained solid material exits the air lock feeder 72 and enters the hose.

The super charger means of air lock feeder 72 also creates an area or region of low pressure area at the outlet or exit port 102 adjacent material entrainment chamber 88 which draws the solid material 106 out of chamber 88, thereby assisting in the fluidization of the material within chamber 88 together with the pressurized air 108 that is pushing on the solid material from behind. The "Super Charge Chamber" design also allows a hose attached to exit port 102 to be constantly charged with air, thereby assuring that the material which is within the hose does not lose momentum and drop from the air stream prior to exiting the hose. The dual chamber arrangement of the supercharger means provides for air flow within a hose coupled to outlet port 102 even when shaft 76 of air lock feeder is rotating at speeds that would simulate a plug in conventional air feeders, by allowing additional air via air channels 96 into the hose to keep the material from falling out of the air stream and clogging the hose.

Preferably, the overall girth of air lock feeder 72 is maximized as much as allowed by the particular application of the invention in order to maximize the width of material entrainment chambers 88 and thereby maximize the amount of time each individual material entrainment chamber 88 has to pass by the exit port 102 during each rotational cycle. Such an arrangement allows more time for air entrained solid material to exit each material entrainment chamber 88. The increased dwell time allows for air lock feeder 72 to employ longer material entrainment chambers 88 and higher volume displacements. The air inlet port 100 can be fitted with an adjustable gate (not shown) to allow an operator to control the pressurized air charge entering material entrainment chambers 88 and air channels 96.

The supercharger means of the invention may alternatively comprise other means for introducing pressurized air flow at the outlet port 100 to prevent blockage and increase the level of material 106 entrained in the air stream. For example, it is contemplated that shaft 76 may be hollow or include hollow air channels for directing air from inlet port 100 towards outlet port 102 in a manner similar to air channels 96. It is also contemplated that supercharger air channels may be included longitudinally along bottom 104 of housing 74, either internally or externally relative to housing 74, which deliver pressurized air from inlet port 100 to outlet port 102 to aid in entrainment of solid material 106 in the manner described above. In such arrangements, the supercharger air channels would remain stationary while material entrainment chambers 88 rotated with shaft 76.

The invention may alternatively utilize other feeder systems in addition to air lock feeder 22 and air lock feeder 72 described above. For example, the feeder systems known as Jet-Through feeders and V-Pot feeders (not shown) may also be used with the invention. The Jet-through and V-Pot type feeder systems generally have a cylindrical housing with a rotatable shaft and vanes mounted therein in a similar manner to the air lock feeder 22 described above, but include an outlet port in the bottom of the housing through which some or all of the material drops into a separate, isolated secondary chamber below the feeder housing, from which the material is entrained and conveyed by fast moving pressurized air. Gravity drops material into the lower, secondary chamber, and a combination of air speed and pressure keep the product airborne until it comes out the end of a delivery hose joined to the secondary chamber. This is generally called a catch and run design, and is well-suited for air-entrainment and conveying of powders but is, not as effective for aggregate materials. Powders are dense and allow a minimal volume of air to slip through the material as it is conveyed out the end of the delivery hose. Aggregates, in contrast, tend to be porous and allow a considerable amount of air to pass through the material, and thus require a higher volume of air to move the material. Increased air pressure is thus required for aggregate materials than powders, and it becomes more difficult for gravity to drop aggregate material into the air stream with Jet-through and V-pot feeders, thus preventing such feeders from emptying completely. The end result is that as the length of a delivery hose is increased, the air pressure in the secondary chamber is increased and less aggregate material can be transported. Thus, the invention preferably uses air lock feeder 22 or the alternative embodiment air lock feeder 72 as described above for pneumatic conveyance and application of aggregate materials.

Accordingly, it will be seen that the present invention provides a chip blower apparatus which provides for quick and facile application of wood chips, fibrous materials, aggregate materials, or other solid particulate materials. The blower apparatus comprising the invention provides a clean and efficient means of pneumatically conveying solid particulate products, and particularly aggregate products. The need for heavy, surface-damaging construction equipment to convey and spread material on playground or landscaped surfaces is eliminated, and the need for labor is greatly reduced due to the use of air conveyance. The invention further allows application of aggregate or other materials on top of retaining walls and on steep slopes which are otherwise inaccessible by conventional means. Aggregate material applied with the invention is compacted when installed on the ground, thereby allowing for wheel chair access in compliance with ADA requirements. Roadside hazard during application of aggregate material with the invention is reduced due to the reduced manpower required for use of the invention. Although the description above contains many specificities, these should not be construed as limiting the scope of the invention but as merely providing illustrations of some of the presently preferred embodiments of this invention.

What is claimed is:

1. A chip blower apparatus, comprising:

(a) a hopper, said hopper having a center portion;

(b) an air lock feeder, said air lock feeder including a housing with first and second ends, said air lock feeder having an opening communicating with said hopper, said air lock feeder including an inlet port adjacent said first end, said air lock feeder including an outlet port adjacent said second end;

(c) agitating means, included in said hopper, for transporting material toward the center portion of said hopper, for preventing bridging of said material in said hopper, and for directing said material toward said opening communicating with said air lock feeder; and (d) blower means for providing pressurized air to said air lock feeder.

2. A chip blower apparatus as recited in claim 1, wherein said air lock feeder further comprises a rotatable shaft, said shaft mounted in said housing between said first and second ends, said shaft including a plurality of laterally disposed vanes, said vanes defining a plurality of chambers within said housing.

3. A chip blower apparatus as recited in claim 1, further comprising a flexible hose, said hose coupled to said outlet port.

4. A chip blower apparatus as recited in claim 1, further comprising chamber conditioning means for increasing pressurized air density from said blower means.

5. A chip blower apparatus as recited in claim 1, further comprising power supply means for driving said air lock feeder, said agitating means, and said blower means.

6. A chip blower apparatus as recited in claim 1, wherein each of said plurality of vanes includes an end, each said end including a flexible strip.

7. A chip blower apparatus, comprising:

(a) a hopper, said hopper having a center portion;

(b) an air lock feeder, said air lock feeder including a cylindrical housing with first and second ends, said air lock feeder having an opening communicating with said hopper, said air lock feeder including an inlet port adjacent said first end, said air lock feeder including an outlet port adjacent said second end;

(c) said air lock feeder including a shaft, said shaft rotatably disposed between said first and second ends, said shaft including a plurality of laterally disposed vanes, said vanes defining a plurality of chambers within said housing, said chambers parallel to said shaft;

(d) agitating means, included in said hopper, for transporting material toward the center portion of said hopper, for preventing bridging of said material in said hopper, and for directing said material toward said opening communicating with said air lock feeder; and (e) blower means for providing pressurized air to said air lock feeder.

8. A chip blower apparatus as recited in claim 7, wherein each of said plurality of vanes includes an end, each said end including a flexible strip.

9. A chip blower apparatus as recited in claim 7, further comprising a flexible hose, said hose coupled to said outlet port.

10. A chip blower apparatus as recited in claim 7, further comprising chamber conditioning means for increasing pressurized air density from said blower means.

11. A chip blower apparatus as recited in claim 7, further comprising power supply means for driving said air lock feeder, said agitating means, and said blower means.

12. A chip blower apparatus, comprising:

(a) a hopper, said hopper including a bottom opening, said hopper including agitating means for directing material towards said bottom opening;

(b) an air lock feeder, said air lock feeder including a cylindrical housing with first and second ends, said air lock feeder having an opening communicating with said bottom opening in said hopper, said air lock feeder including an inlet port adjacent said first end, said air lock feeder including an outlet port adjacent said second end;

(c) said air lock feeder including a shaft, said shaft rotatably disposed between said first and second ends, said shaft including a plurality of laterally disposed vanes, each said vane having an end, each said end including a flexible strip, said vanes defining a plurality of material entrainment chambers within said housing, said material entrainment chambers parallel to said shaft, said material entrainment chambers longitudinally extending between said first and second ends;

(d) said air lock feeder including air supercharger means for increasing the output of air entrained solid material exiting said chambers; and (e) blower means for providing pressurized air to said air lock feeder.

13. A chip blower apparatus as recited in claim 12, further comprising a flexible hose, said hose coupled to said outlet port.

14. A chip blower apparatus as recited in claim 12, further comprising chamber conditioning means for increasing pressurized air density from said blower means.

15. A chip blower apparatus as recited in claim 12, further comprising power supply means for driving said air lock feeder, said agitating means, and said blower means.

16. A chip blower apparatus as recited in claim 12, wherein said air supercharger means comprises a plurality of air channels in said air lock feeder, said air channels parallel to said shaft, said air channels adjacent said shaft, said air channels defined by a plurality of dividers, said dividers positioned between adjacent said vanes, said dividers separating said air channels from said material entrainment chambers.

17. A chip blower apparatus, comprising:

(a) a hopper;

(b) an air lock feeder, said air lock feeder including a housing with first and second ends, said air lock feeder having an opening communicating with said hopper, said air lock feeder including an inlet port adjacent said first end, said air lock feeder including an outlet port adjacent said second end, said air lock feeder including a rotatable shaft, said shaft mounted in said housing between said first and second ends, said shaft including a plurality of laterally, disposed vanes, said vanes defining a plurality of chambers within said housing;

(c) agitating means, included in said hopper, for directing material toward said opening communicating with said air lock feeder;

(d) blower means for providing pressurized air to said air lock feeder; and (e) supercharger means for increasing the output of air entrained solid material exiting said chambers.

18. A chip blower apparatus as recited in claim 17, wherein said supercharging means comprises a plurality of air channels in said air lock feeder, said air channels parallel to said shaft, said air channels formed by a plurality of dividers, said dividers positioned between adjacent said vanes.

19. A chip blower apparatus, comprising:

(a) a hopper;

(b) an air lock feeder, said air lock feeder including a cylindrical housing with first and second ends, said air lock feeder having an opening communicating with said hopper, said air lock feeder including an inlet port adjacent said first end, said air lock feeder including an outlet port adjacent said second end;

(c) said air lock feeder including a shaft, said shaft rotatably disposed between said first and second ends, said shaft including a plurality of laterally disposed vanes, said vanes defining a plurality of chambers within said housing, said chambers parallel to said shaft;

(d) agitating means, included in said hopper, for directing material toward said opening communicating with said air lock feeder;

(e) blower means for providing pressurized air to said air lock feeder; and (f) a plurality of air channels in said air lock feeder, said air channels parallel to said shaft, said air channels formed by a plurality of dividers, said dividers positioned between adjacent said vanes.

* * * * *

UNITED STATES PATENT AND TRADEMARK OFFICE
CERTIFICATE OF CORRECTION

PATENT NO. : 5,725, 160
DATED : March 10, 1998
INVENTOR(S) : Derick E. Harper; Gordon D. Hammond It is certified that error appears in the above-indentified patent and that said Letters Patent is hereby corrected as shown below:

Column 6, line 26, change "pans" to --parts--.

Column 9, line 35, change "preven" to --prevent--.

Column 9, line 35, before "entrained" insert --clogging or formation of slugs of air--.

Signed and Sealed this

Twenty-first Day of July, 1998

Attest:

BRUCE LEHMAN

*Attesting Officer*  *Commissioner of Patents and Trademarks*